United States Patent
Bonen et al.

(10) Patent No.: US 10,419,066 B1
(45) Date of Patent: Sep. 17, 2019

(54) REMOTE RADIO FREQUENCY (RF) AGC LOOP

(71) Applicant: Harmonic, Inc., San Jose, CA (US)

(72) Inventors: Adi Bonen, Belle Mead, NJ (US); Yehezkel Menashe, Kiryat-Ata (IL)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/153,373

(22) Filed: Oct. 5, 2018

Related U.S. Application Data

(60) Provisional application No. 62/568,759, filed on Oct. 5, 2017.

(51) Int. Cl.
    *H04B 3/08* (2006.01)

(52) U.S. Cl.
    CPC ........................... *H04B 3/08* (2013.01)

(58) Field of Classification Search
    CPC ............. H04B 10/2931; H04B 10/294; H04B 3/02–08; H04B 2001/0408–0441; H04B 2001/045; H04W 52/52; H04M 9/027; H03B 1/005; H03B 1/0053; H03B 1/0057
    USPC ................. 375/219–221, 286–288, 295–297
    See application file for complete search history.

(56) References Cited

U.S. PATENT DOCUMENTS

| | | | | |
|---|---|---|---|---|
| 3,648,178 A * | 3/1972 | Hershberg | ........... | H04B 14/006 370/482 |
| 4,881,081 A * | 11/1989 | Yoshihara | ............ | H01Q 1/1257 342/359 |
| 5,510,931 A * | 4/1996 | Suyama | ............. | H04B 10/0777 359/341.2 |
| 5,535,238 A * | 7/1996 | Schilling | ................ | H04B 1/707 375/142 |
| 5,828,477 A * | 10/1998 | Nilsson | .............. | H04B 10/2537 398/185 |
| 6,160,820 A * | 12/2000 | Isaksson | ............... | H04L 5/0007 370/480 |
| 6,282,683 B1 * | 8/2001 | Dapper | ................... | G06F 17/14 348/E7.07 |
| 6,356,555 B1 * | 3/2002 | Rakib | ................. | H03M 13/256 370/441 |
| 6,426,832 B1 * | 7/2002 | Kinoshita | ............ | H04B 10/294 359/337 |
| 6,490,727 B1 * | 12/2002 | Nazarathy | ........... | H04J 14/0226 14/226 |

(Continued)

*Primary Examiner* — James M Perez
(74) *Attorney, Agent, or Firm* — Brokaw Patent Law PC; Christopher J. Brokaw

(57) ABSTRACT

Approaches for supporting a RF automatic gain control (AGC) loop. A first module and a second module are coupled together via a single RF transmission cable. The first module might be a Remote PHY Device (RPD). The second module may comprise a power amplifier. Both the first and second module operate on a single automatic gain control (AGC) loop. The first module sends a first signal to the second module over the single RF transmission cable at a first frequency or frequency range. The first module may adjust a gain of the AGC loop based on a second signal sent from the second module to the first module over the single RF transmission cable. The second, counterpropagating signal has a different frequency or frequency range than the first frequency of the first signal, e.g., the second frequency or frequency range may be lower than that of the first frequency.

18 Claims, 5 Drawing Sheets

(56) References Cited

U.S. PATENT DOCUMENTS

| | | | | |
|---|---|---|---|---|
| 6,580,549 B1* | 6/2003 | Kinoshita | H04B 10/294 | 359/337 |
| 6,721,368 B1* | 4/2004 | Younis | H03G 1/0088 | 330/129 |
| 7,054,376 B1* | 5/2006 | Rubinstain | H04L 12/4612 | 370/248 |
| 7,200,391 B2* | 4/2007 | Chung | H04W 88/085 | 455/423 |
| 7,257,102 B2* | 8/2007 | Min | H04L 27/38 | 348/E7.073 |
| 7,308,042 B2* | 12/2007 | Jin | H04W 52/225 | 375/297 |
| 7,340,223 B1* | 3/2008 | Wright | H01Q 1/243 | 375/297 |
| 7,346,122 B1* | 3/2008 | Cao | H03F 1/0211 | 375/285 |
| 7,415,254 B2* | 8/2008 | Kuriyama | H03G 3/02 | 330/278 |
| 7,924,751 B2* | 4/2011 | Dean | H04B 7/15535 | 370/274 |
| 8,213,888 B2* | 7/2012 | Kuriyama | H03G 3/02 | 330/278 |
| 8,384,476 B2* | 2/2013 | Draxler | H03F 1/3247 | 330/149 |
| 8,428,181 B2* | 4/2013 | Chan | H03G 3/3042 | 375/297 |
| 8,515,367 B2* | 8/2013 | Nakamura | H03F 1/0211 | 330/129 |
| 8,761,305 B2* | 6/2014 | Chan | H04M 1/7255 | 375/130 |
| 8,873,676 B2* | 10/2014 | Rozenblit | H03G 3/001 | 375/297 |
| 9,325,553 B2* | 4/2016 | Kaukovuori | H04B 1/0057 | |
| 9,356,639 B1* | 5/2016 | Chapman | H04B 1/28 | |
| 9,838,751 B2* | 12/2017 | Arcidiacono | H04B 7/18523 | |
| 2003/0086398 A1* | 5/2003 | Hiltunen | H04B 1/109 | 370/335 |
| 2003/0185287 A1* | 10/2003 | Ogawa | H04B 3/36 | 375/211 |
| 2003/0214965 A1* | 11/2003 | Chen | H04B 10/2503 | 370/431 |
| 2004/0104771 A1* | 6/2004 | Dauphinee | G01R 31/2607 | 330/129 |
| 2004/0229581 A1* | 11/2004 | Mizoguchi | H04B 7/082 | 455/136 |
| 2006/0209892 A1* | 9/2006 | MacMullan | H04N 5/775 | 370/468 |
| 2007/0098007 A1* | 5/2007 | Prodan | H04L 12/2801 | 370/443 |
| 2007/0286601 A1* | 12/2007 | Takami | H03G 3/3084 | 398/45 |
| 2008/0008263 A1* | 1/2008 | Keerthi | H03F 1/0222 | 375/297 |
| 2008/0211583 A1* | 9/2008 | Nguyen | H03F 1/0211 | 330/297 |
| 2008/0260066 A1* | 10/2008 | Cai | H03F 1/3294 | 375/297 |
| 2009/0190638 A1* | 7/2009 | Meir | H04L 12/2801 | 375/222 |
| 2010/0087227 A1* | 4/2010 | Francos | H03F 1/3247 | 455/562.1 |
| 2010/0093298 A1* | 4/2010 | Pratt | H04B 1/109 | 455/226.1 |
| 2012/0082072 A1* | 4/2012 | Shen | H04L 27/0002 | 370/297 |
| 2012/0282854 A1* | 11/2012 | Arcidiacono | H04H 40/90 | 455/3.02 |
| 2013/0016649 A1* | 1/2013 | Damnjanovic | H04W 88/04 | 370/315 |
| 2013/0114644 A1* | 5/2013 | Arcidiacono | H04B 1/707 | 375/145 |
| 2013/0125194 A1* | 5/2013 | Finkelstein | H04L 12/2801 | 725/129 |
| 2013/0208632 A1* | 8/2013 | Williams | H04B 15/00 | 370/279 |
| 2015/0035545 A1* | 2/2015 | Langer | H04W 52/226 | 324/629 |
| 2015/0098525 A1* | 4/2015 | Kohara | H03G 3/3042 | 375/298 |
| 2015/0146336 A1* | 5/2015 | Girard | H02H 9/08 | 361/119 |
| 2015/0214958 A1* | 7/2015 | Ramesh | H03L 1/00 | 331/34 |
| 2015/0295987 A1* | 10/2015 | Finocchiaro | H04N 21/222 | 709/203 |
| 2016/0087698 A1* | 3/2016 | Chang | H04L 5/14 | 370/276 |
| 2016/0308577 A1* | 10/2016 | Molina | H04B 1/62 | |
| 2017/0012681 A1* | 1/2017 | Buliga | H04B 7/0413 | |
| 2017/0063583 A1* | 3/2017 | Reinhardt | H04B 1/401 | |
| 2017/0099100 A1* | 4/2017 | Bush | H04B 10/25751 | |
| 2017/0257201 A1* | 9/2017 | Eitan | H04B 7/0413 | |
| 2018/0212706 A1* | 7/2018 | Ghuman | H04J 14/0282 | 14/282 |
| 2018/0310255 A1* | 10/2018 | Simonsson | H04W 52/245 | |
| 2019/0007910 A1* | 1/2019 | Akula | H04W 52/346 | |
| 2019/0052392 A1* | 2/2019 | DeAndrea | H04J 14/0212 | |
| 2019/0207738 A1* | 7/2019 | Son | H04L 5/14 | |

* cited by examiner

US 10,419,066 B1

REMOTE RADIO FREQUENCY (RF) AGC LOOP

CLAIM OF PRIORITY

The present application claims priority to U.S. Provisional Patent Application No. 62/568,759, entitled "Remote RF AGC Loop," filed Oct. 5, 2017, the disclosure of which is hereby incorporated by reference for all purposes in its entirety as if fully set forth herein.

FIELD OF THE INVENTION

Embodiments of the invention generally relate to a radio frequency (RF) automatic gain control (AGC) loop, and more particularly, relate to a RF AGC in a Remote PHY node (RPN).

BACKGROUND

A Converged Cable Access Platform (CCAP) is an industry standard platform for transmitting video data and voice content. The CCAP is led by CableLabs of Sunnyvale, Calif. CCAP unifies the Converged Multiservice Access Platform (CMAP), managed by Comcast Corporation of Philadelphia, Pa., with the Converged Edge Services Access Router platform (CESAR), which is managed by Time Warner Cable, Inc of New York, N.Y.

CableLabs has publicly issued a Remote PHY family of specifications, known as the MHAv2 specifications (Modular Headend Architecture version 2). These specifications describe how a CCAP platform may be separated into two components, (1) a CCAP Core located at a cable headend, and (2) a Remote PHY device (RPD), which is typically located outdoors. A RPD may be located, for example, at the junction of the fiber and coax plants in an optical node serving as a Remote PHY Node (RPN). A CCAP core can control and setup data paths with multiple RPDs situated in multiple fiber nodes. FIG. 1 is a block diagram of a CCAP platform which includes an RPD situated inside an RPN in accordance with the MHAv2 specifications of the prior art.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a radio frequency (RF) automatic gain control (AGC) loop that may be deployed across one or more modules coupled by a transmission cable are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

An automatic gain control (AGC) circuit is a closed-loop feedback regulating circuit in an amplifier or chain of amplifiers. An AGC circuit is used to maintain a suitable signal amplitude at its output, regardless of any variation of the signal amplitude at its input and regardless of signal gain variations of various circuit components such as signal amplifiers. AGC loops are typically implemented entirely within a single physical component.

Advances in radio frequency (RF) automatic gain control (AGC) loops, which may be deployed in a Remote PHY node (RPN), are discussed herein. Advantageously, RF AGC loops may be extended across separate computerized modules coupled by a single transmission cable. In doing so, the single transmission cable may convey a high frequency RF signal in one direction, while conveying a lower frequency RF signal in the other direction. Further, the gain in the RF AGC loop may be controlled in a first module based on power detector measurements taken at the output of the second module.

For purposes of providing a concrete example, certain embodiments of the invention will be discussed with reference to implementing embodiments of the invention within a Remote PHY node; however, embodiments of the invention may be employed by separate modules in other contexts and environments. For example, certain embodiments may be employed at a Remote MACPHY node (RMN). CableLabs has issued a technical report about the R-MACPHY architecture and is currently undertaking an effort to formalize a specification for R-MACPHY products, specifically a Remote MACPHY Device (RMD) which resides in a Remote MACPHY node (RMN). This technical report describes Remote MACPHY (or MAC-PHY) as a generic term given to the distributed CMTS/CCAP architecture where the DOCSIS MAC and PHY layer processing of a CMTS are moved from the headend down to a Fiber Node location. Other embodiments of the invention may be implemented in a plurality of different modules which are coupled together electronically over one or more transmission cables.

Figure 1:
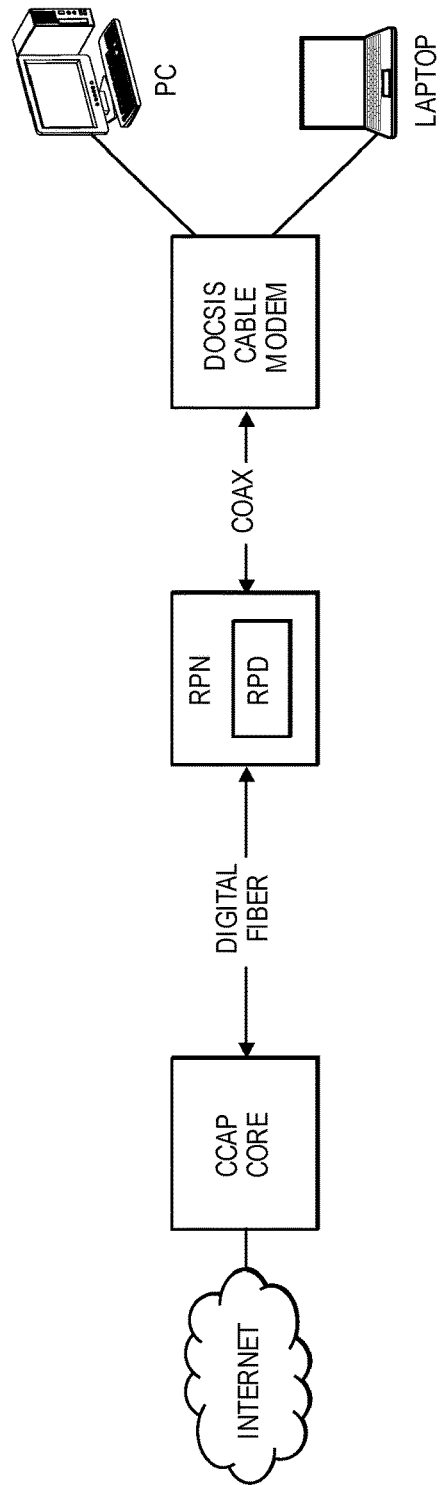
FIG. 1 is a block diagram of a CCAP platform which includes a Remote PHY node (RPN) in accordance with the MHAv2 specifications of the prior art.
Figure 2:
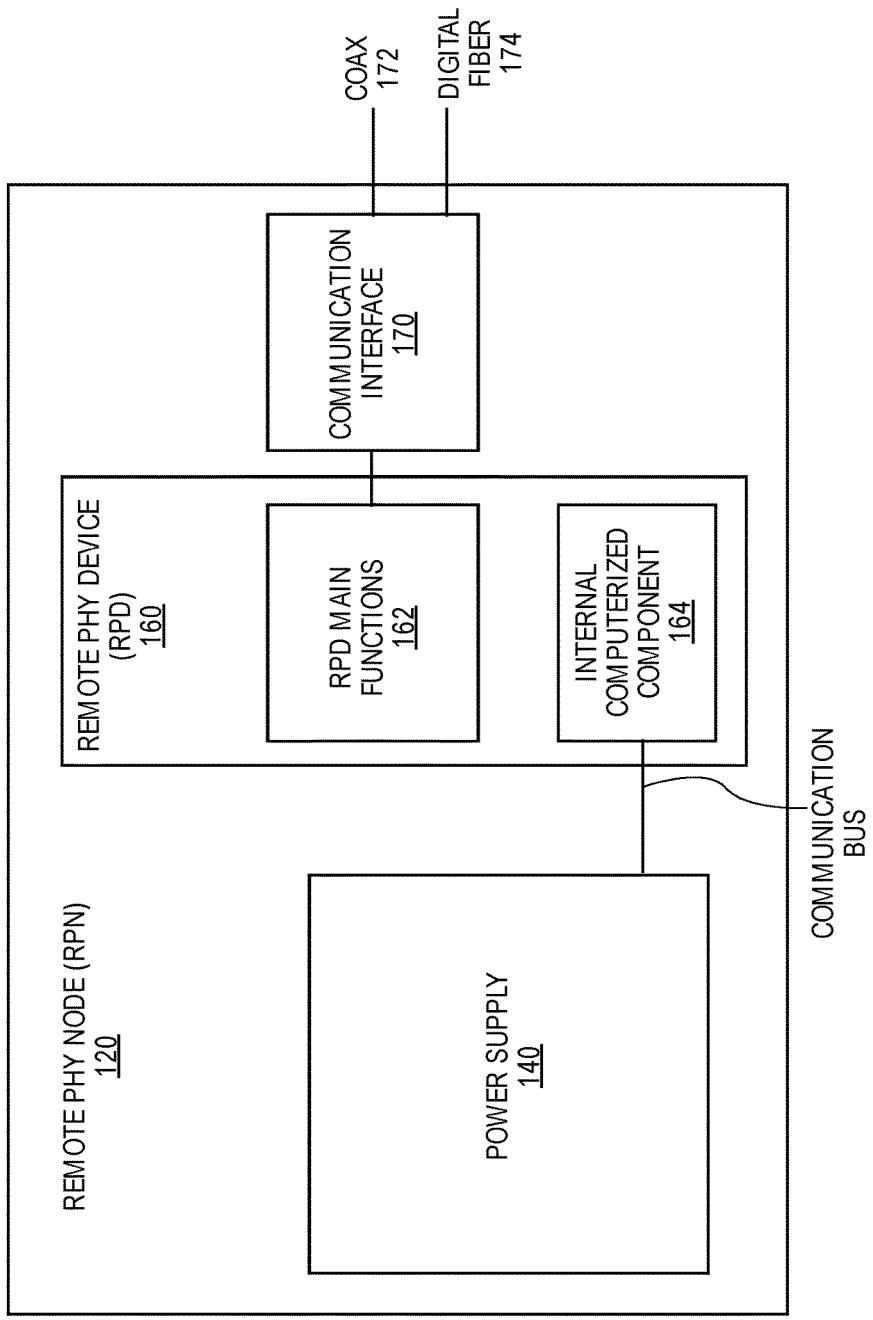
FIG. 2 is a block diagram of a Remote PHY node (RPN), which comprises a Remote PHY device (RPD), according to an embodiment of the invention.

FIG. 2 is a block diagram of a Remote PHY node (RPN) 120 according to an embodiment of the invention. The function of RPN 120 is to convert downstream DOCSIS data, MPEG video, and out-of-band (OOB) signals from digital to analog one way and transmit them over one or more coaxial cables 172 leading to cable subscribers' homes, and receive upstream data and OOB signals from coaxial cables 172 in analog format and convert them to digital the other way. The digital signals are exchanged between the CCAP Core and the RPD, comprised within the RPN, typically over digital fiber 174. RPN 120 may send and receive data over communication links, such as coaxial cables 172 and/or digital fiber 174, using communication interface 170.

Remote PHY nodes, such as RPN 120, are designed to be deployed outdoors near the physical area to be serviced by RPN 120. A non-limiting, illustrative example of RPN 120 includes Harmonic, Inc.'s CableOS™ Ripple-1 Remote PHY node.

RPN 120 is composed of an outer housing that surrounds at least one power supply 140 and at least one Remote PHY Device (RPD) 160. The outer housing of RPN 120 is designed to provide a hermetically sealed environment to the interior of RPN 120. The hermetically sealed environment provided by the outer housing of RPN 120 helps protect internal components, such as power supply 140 and RPD 160, from outdoor environmental factors, such as humidity, water, debris, and changes in pressure.

RPN 120 may comprise an optical network transceiver (SFP), but embodiments may also be employed in contexts where access to other types of communication interface, such as a wireless network, instead of or in addition to the optical network, is available. In addition to data transmitted through the RPD 160 to and from cable subscribers, and in addition to communications required to fulfill the operation of the RPD Main Functions 162, Internal Computerized Component 164 of RPD 160 may send and receive data communications over the optical network (or over a wireless network in contexts where such a network is available). This advantageously allows an operator or technician to send and receive data to RPN 120 deployed in the field, such as for purposes of configuring the operation of RPN 120 and/or providing additional or revised data or executable instructions to RPN 120. For example, the operator or technician may configure the operation of a RF AGC control loop of an embodiment by sending data to RPN 120 deployed in the field.

Remote PHY device (RPD) 160 performs many of the functions involved in converting downstream DOCSIS data, MPEG video, and out-of-band (OOB) signals from digital to analog and upstream data and OOB signals from analog to digital. These functions are depicted in FIG. 2 as being performed by RPD main functions 162. RPD 160 may also comprise internal computerized component 164, which is responsible for certain responsibilities discussed herein, such as controlling the operation of RF AGC loop. A non-limiting, illustrative example of Remote RHY device 310 is Harmonic, Inc.'s CableOS™ Pebble-1 Remote PHY device.

Figure 3:
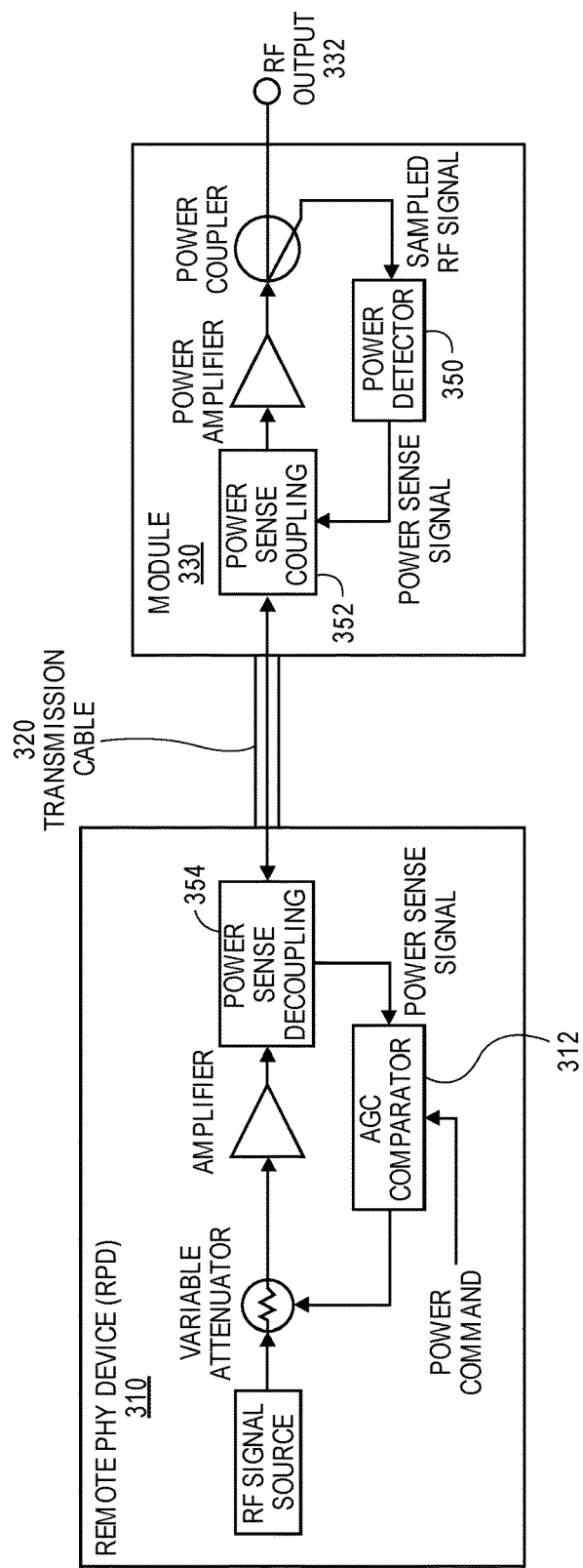
FIG. 3 is an illustration of a Remote PHY device (RPD) coupled to a separate module via a transmission cable according to an embodiment of the invention.

FIG. 3 is an illustration 300 of a Remote PHY device (RPD) 310 coupled to module 330 via a transmission cable 320 according to an embodiment of the invention. Module 330 of FIG. 3 may, but need not, correspond to communication interface 170 of FIG. 2. Module 330 is intended to represent any physical combination of hardware and/or software which may be coupled to remote PHY device 310 via transmission cable 320.

Transmission cable 320 is used to exchange radio frequency (RF) signals between remote PHY device 310 and module 330. A non-limiting, illustrative example of transmission cable 320 is a coaxial cable. Transmission cable 320 of an embodiment may be implemented by any mechanism which allows for the transmission of counterpropagating RF signals.

As shown in FIG. 3, the automatic gain control (AGC) loop control is extended between two separate modules, such as remote PHY device 310 and module 330, where the gain of the complete system is adjusted to maintain a certain power level at the system output, namely RF output 332. The gain is controlled by remote PHY device (RPD) 310 based on power detector measurements taken at RF output 332 of module 330 by power detector 350. The power detector signal measurement is provided to the AGC control comparator 312 of Remote PHY device (RPD) 310 by power sense coupling 352. Power sense coupling 352 does so by coupling/overlaying the power detector signal measurement on the same transmission cable transporting RF between Remote PHY device (RPD) 310 and module 330, namely transmission cable 320.

Figure 4:
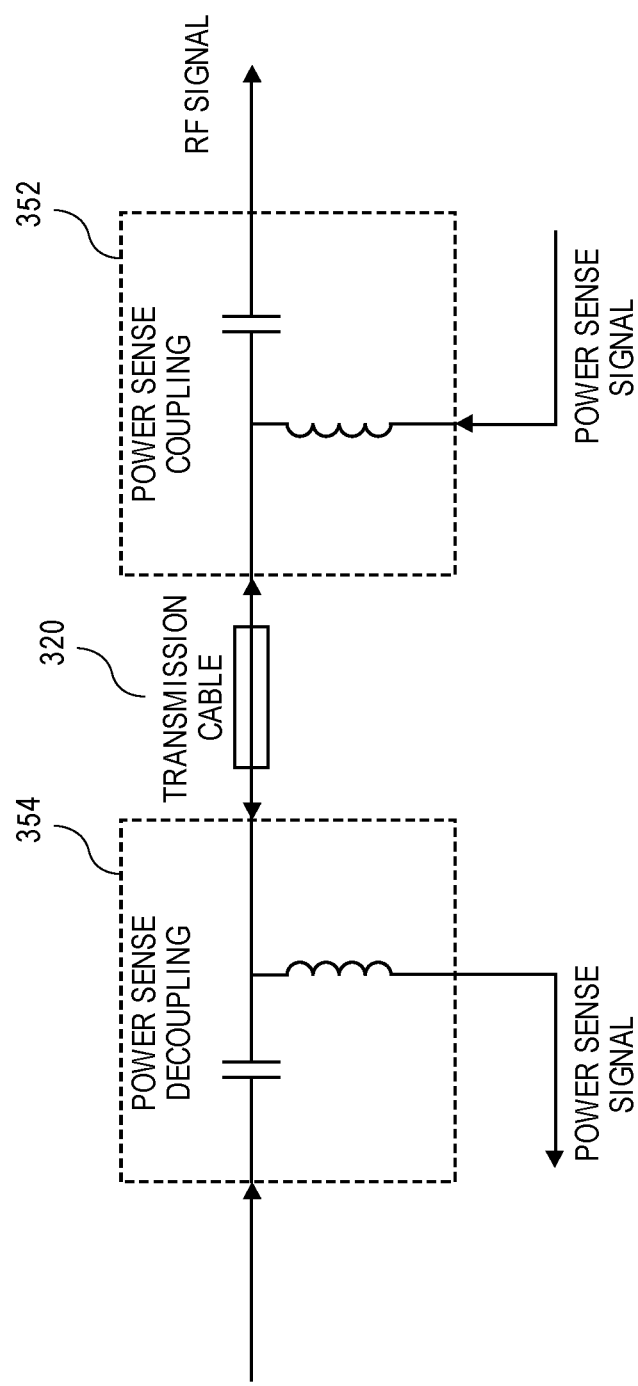
FIG. 4 is an illustration of the power sense coupling and decoupling over the transmission cable according to an embodiment of the invention.

FIG. 4 is an illustration 400 of the power sense coupling and decoupling over transmission cable 320 according to an embodiment of the invention. In an embodiment, implementation of the power sense coupling 352 and decoupling 354 is performed by an inductor (which passes the power sense signal and blocks the RF signal), and a capacitor (which passes the RF signal and blocks the power sense signal). In this way, a first signal may be sent over transmission cable 320 in a first direction at a first frequency (or a first frequency range), and a second signal may be sent over the same transmission cable 320 in a counterpropagating direction at a different frequency (or a different frequency range). For example, the RF signal sent by remote PHY device 310 over transmission cable 320 may be at a higher frequency or higher frequency range than the power detector signal measurement sent by power sense coupling 352 over transmission cable 320 to power sense decoupling 354. In other embodiments, the RF signal sent by remote PHY device 310 over transmission cable 320 may be at a lower frequency or lower frequency range than the power detector signal measurement sent by power sense coupling 352 over transmission cable 320 to power sense decoupling 354.

Figure 5:
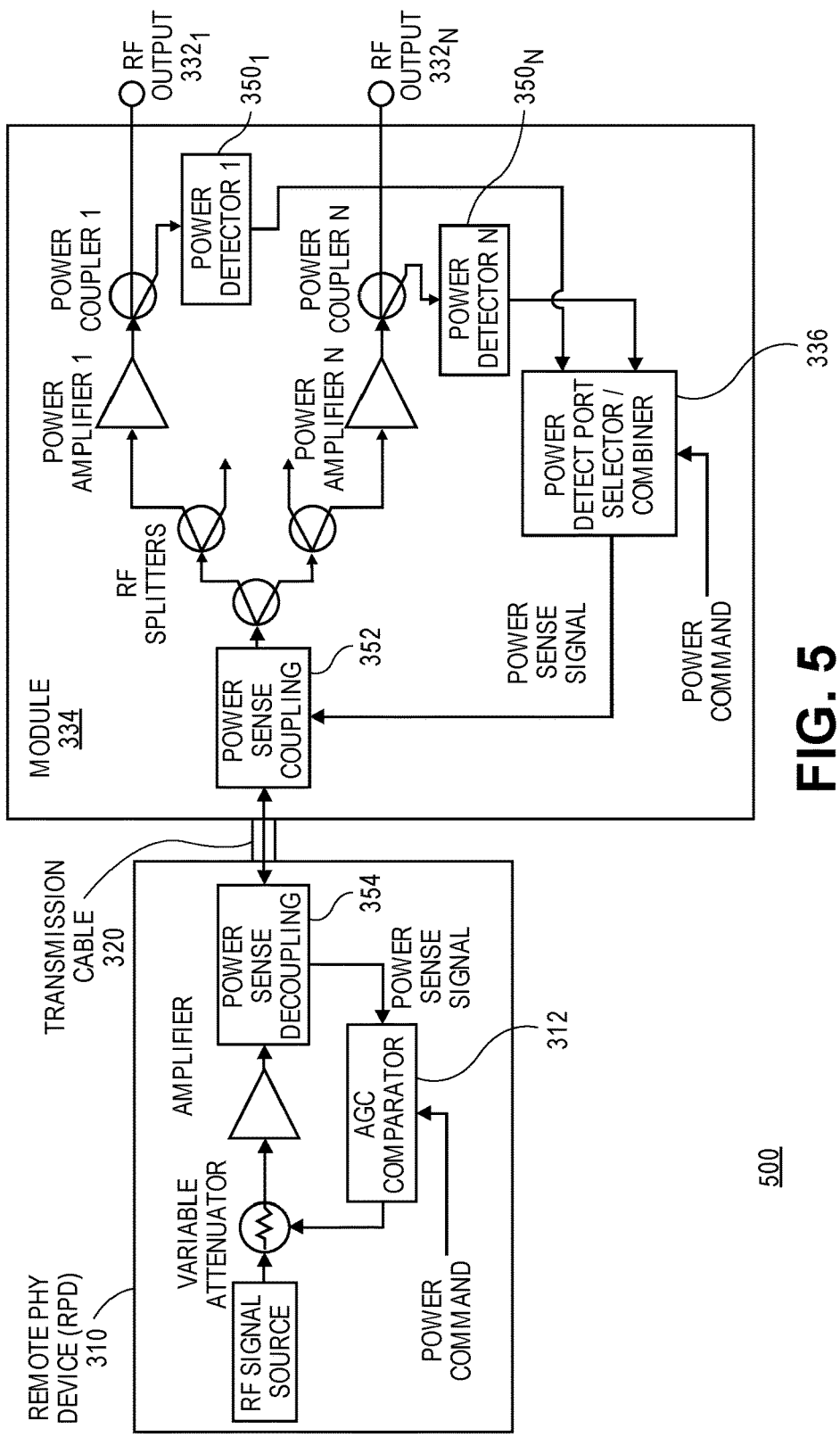
FIG. 5 is an illustration of a Remote PHY device (RPD) coupled to a separate module having a selector according to an embodiment of the invention.

FIG. 5 is an illustration 500 of Remote PHY device (RPD) 310 coupled to module 334 having a selector 336 according to an embodiment of the invention. As shown in FIG. 5, module 334 comprises multiple output ports, namely RF output $332_1$ and RF output $332_N$. Selector 336 allows the operation of the AGC loop to be configured based on multiple output ports 332. While only two output ports are depicted in module 334, module 334 may comprise any number of output ports.

In an embodiment where module 334 comprises multiple output ports 332, selector 336 of module 334 may be used to select which output ports 332 of module 334 should be used to close the AGC loop. Either a single output port 332 may be selected or two or more output ports 332 may be selected. Thus, if module 334 comprises multiple output ports 332, each output port 332 may be individually configured to be part of the AGC loop. Any output ports 332 of module 334 which are not selected will not be part of the AGC loop.

An external computer, such as used by a technician or operator at CCAP Core, may send instructions to RPN 120 to configure the operation of selector 336. Thus, the operation of the AGC loop may be configured by remote personal located remotely from the RPN 120.

In certain embodiments, a combining/averaging operation can be used to close (or implement the behavior of) the AGC loop based on the averaged measurements of selected power detectors 350. In an embodiment, the operation of the AGC loop may be based on an average power level of either all output ports 332 of module 334 or a set of selected output ports 332 of module 334. For example, a remote technician, operator, or an automated system may issue an instruction over digital fiber to RPN 120 to configure the operation of selector 336 to close the AGC loop based on the averaged measurements of two selected power detectors while excluding a third power detector associated with an unused RF output.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus supporting a RF automatic gain control (AGC) loop, comprising:
   a first module and a second module which are coupled together via a single RF transmission cable, wherein both said first module and said second module operate on a single automatic gain control (AGC) loop, wherein said second module comprises a power amplifier,
   wherein the first module sends a first signal to said second module over said single RF transmission cable at a first frequency, and
   wherein the first module adjusts a gain of said AGC loop based on a second signal sent from said second module to said first module over said single RF transmission cable, and wherein said second signal has a second frequency that is different than said first frequency of said first signal.

2. The apparatus of claim 1, wherein said first frequency is higher than said second frequency.

3. The apparatus of claim 1, wherein said first frequency is lower than said second frequency.

4. The apparatus of claim 1, wherein said first module is a Remote PHY device.

5. The apparatus of claim 1, wherein said second module has a plurality of outputs, and wherein said apparatus may configure a particular output, from said plurality of outputs of said second module, to be part of said single automatic gain control (AGC) loop, and wherein all other outputs, in said plurality of outputs, beside said particular output are not part of said single automatic gain control (AGC) loop.

6. The apparatus of claim 1, wherein said single automatic gain control (AGC) loop is based on an average power level at a set of output ports of said second module.

7. The apparatus of claim 1, wherein each of a plurality of output ports, of said second module, can be included as a member in said set of output ports, from which the average power level is calculated, based on a configuration of said apparatus.

8. The apparatus of claim 1, wherein each of a plurality of output ports, of said second module, can be included as a member in said set of output ports, from which the average power level is calculated, based on a configuration of said apparatus, wherein said configuration is determined by an automated process which operates on said apparatus or external to said apparatus.

9. The apparatus of claim 1, wherein said RF transmission cable is a coaxial cable.

10. An apparatus supporting a RF automatic gain control (AGC) loop, comprising:
    a first module and a second module which are coupled together via a single RF transmission cable, wherein both said first module and said second module operate on a single automatic gain control (AGC) loop, wherein said second module comprises a power amplifier,
    wherein the first module sends a first signal to said second module over said single RF transmission cable at a first frequency range, and
    wherein the first module adjusts a gain of said AGC loop based on a second signal sent from said second module to said first module over said single RF transmission cable, and wherein said second signal has a second frequency range that is different than said first frequency range of said first signal.

11. The apparatus of claim 10, wherein said first frequency range is higher than said second frequency range.

12. The apparatus of claim 10, wherein said first frequency range is lower than said second frequency range.

13. The apparatus of claim 10, wherein said first module is a Remote PHY device.

14. The apparatus of claim 10, wherein said second module has a plurality of outputs, and wherein said apparatus may configure a particular output, from said plurality of outputs of said second module, to be part of said single automatic gain control (AGC) loop, and wherein all other outputs, in said plurality of outputs, beside said particular output are not part of said single automatic gain control (AGC) loop.

15. The apparatus of claim 10, wherein said single automatic gain control (AGC) loop is based on an average power level at a set of output ports of said second module.

16. The apparatus of claim 10, wherein each of a plurality of output ports, of said second module, can be included as a member in said set of output ports, from which the average power level is calculated, based on a configuration of said apparatus.

17. The apparatus of claim 10, wherein each of a plurality of output ports, of said second module, can be included as a member in said set of output ports, from which the average power level is calculated, based on a configuration of said apparatus, wherein said configuration is determined by an automated process which operates on said apparatus or external to said apparatus.

18. The apparatus of claim 10, wherein said RF transmission cable is a coaxial cable.

\* \* \* \* \*